United States Patent
Skvirski

(10) Patent No.: US 9,948,818 B2
(45) Date of Patent: Apr. 17, 2018

(54) METHOD FOR PROCESSING DATA AND DATA COLLECTOR FOR PROCESSING DATA

(71) Applicant: Alexei Skvirski, Duesseldorf (DE)

(72) Inventor: Alexei Skvirski, Duesseldorf (DE)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/406,063

(22) Filed: Jan. 13, 2017

(65) Prior Publication Data

US 2017/0214819 A1    Jul. 27, 2017

(30) Foreign Application Priority Data

Jan. 27, 2016  (EP) ................................... 16152991

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/32* | (2006.01) | |
| *G06F 17/30* | (2006.01) | |
| *H04N 1/00* | (2006.01) | |
| *G06F 11/34* | (2006.01) | |

(52) U.S. Cl.
CPC ....... *H04N 1/32122* (2013.01); *G06F 3/1294* (2013.01); *G06F 11/3495* (2013.01); *G06F 17/3028* (2013.01); *G06F 17/30557* (2013.01); *H04N 1/00323* (2013.01); *H04N 2201/0094* (2013.01); *H04N 2201/3202* (2013.01)

(58) Field of Classification Search
CPC ........... H04N 1/32122; H04N 1/00323; H04N 2201/0094; H04N 2201/3202; G06F 17/3028

USPC ............................... 358/1.1, 1.15, 1.13, 1.14
See application file for complete search history.

(56) References Cited

U.S. PATENT DOCUMENTS

| | | |
|---|---|---|
| 5,893,115 A | 4/1999 | Lewis |
| 6,208,428 B1 | 3/2001 | Chihara et al. |
| 2005/0280694 A1* | 12/2005 | Tsujino ...................... B41J 2/45 347/238 |

(Continued)

FOREIGN PATENT DOCUMENTS

| | | |
|---|---|---|
| EP | 0881566 A2 | 12/1998 |
| EP | 2778955 A1 | 9/2014 |
| GB | 2307760 A | 6/1997 |

OTHER PUBLICATIONS

European Search Report dated Jul. 11, 2016 in European Application 16152991.2, filed on Jan. 27, 2016 (with Written Opinion).

*Primary Examiner* — Douglas Tran
(74) *Attorney, Agent, or Firm* — Oblon, McClelland, Maier & Neustadt, L.L.P.

(57) ABSTRACT

A method for processing data of a parameter counter for an image forming process includes providing a cumulative data structure for storing at least one record for recording for a predetermined accrual period a cumulative total for a parameter counter for an image forming process, providing data of a parameter counter for a time period, determining whether or not the time period corresponds to a predetermined accrual period for which an existing cumulative total is recorded in the cumulative data structure, and updating the cumulative data structure based on the data of the parameter counter.

13 Claims, 3 Drawing Sheets

(56) References Cited

U.S. PATENT DOCUMENTS

2008/0137130 A1   6/2008  Ferlitsch
2009/0180139 A1   7/2009  Ooba
2013/0083360 A1*  4/2013  Kobayashi ......... G06K 15/1817
                                                          358/1.15

* cited by examiner

METHOD FOR PROCESSING DATA AND DATA COLLECTOR FOR PROCESSING DATA

CROSS-REFERENCE TO RELATED APPLICATIONS

The present application is based upon and claims the benefit of priority of European Patent Application No. 16152991.2, filed on Jan. 27, 2016, the contents of which are incorporated herein by reference in their entirety.

BACKGROUND OF THE INVENTION

1. Field of the Invention

The present disclosure relates to a method for processing data and to a data collector for processing data. More particularly, the data may be data of a parameter counter for an image forming process.

2. Description of the Related Art

Data collection methods are used in information processing practice. The data may relate to the processes of an image forming apparatus, for example. Data relating to an image forming apparatus are collected by a data collector. The data are stored in a data collector database in the data collector.

In such a system a large amount of process-specific, device-specific and/or user-specific data may need to be collected, stored and subsequently reported on. In the field of image forming, there may be a counter for each of hundreds of different parameters. Furthermore, a data collector may receive data for these counters from hundreds of different image forming apparatuses. A data collector database may store of the order of about 100 gigabytes of data, for example.

The data collector may receive data for these counters by polling the image forming apparatuses. The polling can be unreliable in that sometimes an image forming apparatus may not respond to provide the data.

SUMMARY OF THE INVENTION

In one aspect, the present disclosure provides a method for processing data of a parameter counter for an image forming process, in which data can be collected and stored more cheaply, efficiently and/or more quickly compared to the prior art.

In another aspect, the present disclosure provides a data collector that can carry out a method of the present disclosure. In particular, the present disclosure provides a data collector that can collect and store data more cheaply, more efficiently and/or more quickly compared to the prior art.

The techniques introduced herein overcome the deficiencies and limitations of the prior art, at least in part, with a method for processing data of a parameter counter for an image forming process. The method includes: providing a cumulative data structure for storing at least one record for recording for a predetermined accrual period a cumulative total for a parameter counter for an image forming process; providing data of a parameter counter for a time period; determining whether or not the time period corresponds to a predetermined accrual period for which an existing cumulative total is recorded in the cumulative data structure; and updating the cumulative data structure based on the data of the parameter counter. If it is determined that the time period corresponds to a predetermined accrual period for which an existing cumulative total is recorded in the cumulative data structure, the updating includes updating the existing cumulative total. If it is determined that the time period does not correspond to a predetermined accrual period for which an existing cumulative total is recorded in the cumulative data structure, the updating includes starting a new cumulative total for a new predetermined accrual period to which the time period corresponds.

Accordingly, the method for processing data consolidates the data. This permits automatic binding of already recorded data into specific records of a coarser granularity, based on the required aggregation time granule (accrual period). The reporting speed depends on the amount of data required to be extracted, evaluated and processed. Accordingly, the present disclosure reduces the amount of data stored in the data collecting database, thereby speeding up reporting. The present disclosure provides an efficient method for parameter counters to be stored and reported on.

Optionally, the method includes producing the data of the parameter counter for the time period by calculating the difference between two parameter counter values at different times.

Accordingly, the present disclosure can robustly consolidate data inline (i.e. as it is stored rather than after it has been stored) even when polling of the image forming apparatuses is unreliable.

Accordingly, the data of the parameter counter for the time period does not add to the amount of data stored in the data collector database. This helps to reduce the time it takes for data for a report to be outputted from the data collector database.

Optionally, the cumulative data structure is stored in a data collector database from which data of the parameter counter is outputted for a report.

Accordingly, the data collector database can be updated inline. When new data of the parameter counter for a new time period is provided, the data collector database can be updated. This means that it is not necessary for the records that form the data collector database to be generated elsewhere and subsequently moved to the data collector database. This helps to reduce the amount of memory required and to reduce the number of processing steps.

According to an alternative option, the cumulative data structure is stored in a cache memory that is separate from a data collector database from which data of the parameter counter is outputted for a report.

Accordingly, the data collector database can be used for storing only records for completed accrual periods. Until an accrual period is finished the record can be stored in a separate cache memory. This helps to improve the quality of the data stored in the data collector database.

Optionally, when it is determined that the time period does not correspond to a predetermined accrual period for which an existing cumulative total is recorded in the cumulative data structure, the record recording the predetermined accrual period and the existing cumulative total is stored in the data collector database.

Accordingly, the data is permanently stored only after it has been consolidated. This reduces the data sparsity (i.e. increases the data density) in the data collector database, which speeds up reporting from the data collector database.

Optionally, after the record is stored in the data collector database, the record is deleted from the cache memory.

Accordingly, after each record is written into the data collector database, the record is wiped from the cache memory (or other memory in which the cumulative data structure is stored). This reduces the size of the cache memory required.

Optionally, the record is copied from the cache memory to the data collector database without undergoing substantially any data format transformation before being stored in the data collector database.

Accordingly, the process of consolidating the data and storing it is streamlined, thereby reducing the time and computational power required.

Optionally, the method includes outputting from the data collector database data of the parameter counter for a report based on the information stored in the data collector database.

Accordingly, a report can be produced more quickly and efficiently from the data collector database that has higher data density.

Optionally, each record stores for each predetermined accrual period one or more of: a unique identifier for an image forming apparatus that performed the image forming process that the parameter counter is for; a start accrual interval timestamp indicating a start of a predetermined accrual period; an end accrual interval timestamp indicating an end of a predetermined accrual period; a personal identifier indicating a user that instructed the image forming process that the parameter counter is for; and a parameter identifier indicating the image forming process.

Accordingly, data can be stored in a manner that distinguishes between different image forming apparatuses, different image forming processes, different accrual periods, and different users.

Optionally, after the cumulative data structure has been updated based on the data of the parameter counter, the data of the parameter counter is deleted from the cache memory in which the cumulative data structure is stored.

Accordingly, this reduces the size of the cache memory required.

Optionally, the method includes identifying that the parameter counter of which the data is provided for the time period corresponds to the parameter counter for which an existing cumulative total is recorded in the cumulative data structure. Optionally, the cumulative data structure stores a record for each of a plurality of parameter counters.

Accordingly, data for different counters can be recorded simply in a single cumulative data structure.

Optionally, the new predetermined accrual period is chronologically subsequent to the predetermined accrual period for which the existing cumulative total is recorded in the cumulative data structure.

Accordingly, data can be efficiently stored in a time series manner.

Optionally, the parameter counter is of a cumulative type.

Accordingly, cumulative-type data can be efficiently stored based on predetermined accrual periods corresponding to different periods in time.

Optionally, the data collector database stores the records according to a relational database management system. Optionally, the cumulative data structure stores the records according to a relational database management system.

Accordingly, a standard relational database system can be used to store the data in the data collector database. The relational database management system is for data storage. The relational database management system is cheap, easily manageable, efficient in data storage and widespread on the market. Hence, data can be stored efficiently in the data collector database.

Furthermore, the techniques introduced herein overcome the deficiencies and limitations of the prior art, at least in part, with a data collector for processing data of a parameter counter for an image forming process. The data collector includes: a cumulative data structure for storing at least one record for recording for a predetermined accrual period a cumulative total for a parameter counter for an image forming process; a processor configured to, for data of a parameter counter for a time period, determine whether or not the time period corresponds to a predetermined accrual period for which an existing cumulative total is recorded in the cumulative data structure; and the processor configured to update the cumulative data structure based on the data of the parameter counter. When the processor determines that the time period corresponds to a predetermined accrual period for which an existing cumulative total is recorded in the cumulative data structure, the processor is configured to update the existing cumulative total. When the processor determines that the time period does not correspond to a predetermined accrual period for which an existing cumulative total is recorded in the cumulative data structure, the processor is configured to start a new cumulative total for a new predetermined accrual period to which the time period corresponds.

The object and advantages of the invention will be realized and attained by means of the elements and combinations particularly pointed out in the claims. It is to be understood that both the foregoing general description and the following detailed description are exemplary and explanatory and are not restrictive of the invention as claimed.

DETAILED DESCRIPTION OF EMBODIMENTS

A description will be given of embodiments with reference to the accompanying drawings.

Figure 1:
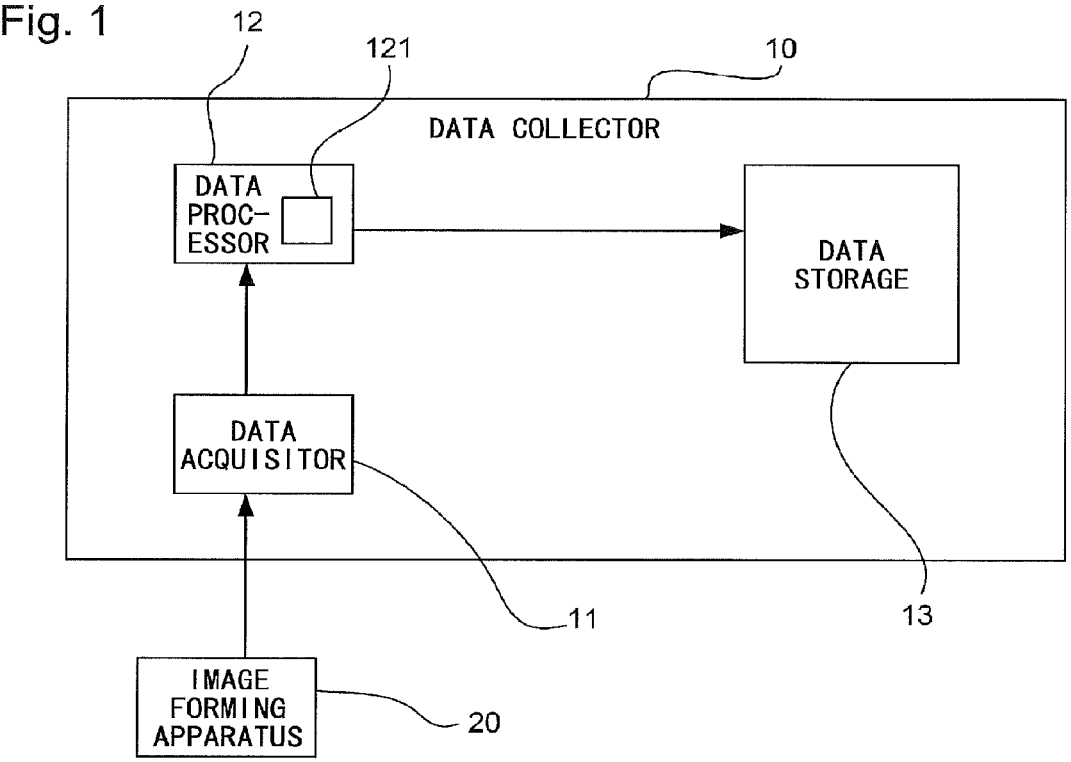
FIG. 1 schematically depicts a system for data collection according to an embodiment.

FIG. 1 schematically depicts a system for data collection and data storage according to an embodiment of the invention. A data collector 10 is connected to one or more image forming apparatuses 20. The image forming apparatus 20 is configured to output data of a parameter counter for an image forming process. The data collector 10 is configured to store a data collector database. The data collector database is stored in data storage 13.

The data collector 10 obtains data from one or more image forming apparatuses 20. Optionally, data is written into the data collector database in the data storage 13 via a data processor 12. The data collector 10 may be in data communication with of the order of about 100 or 1000 image forming apparatuses 20. The data form the image forming apparatuses 20 may be stored in the data collector database in the data storage 13 for several years.

Hence, each data collector 10 may store a large amount of data in the corresponding data collector database. For example, a data collector database may store of the order of about 100 gigabytes of data.

Optionally, the data collector 10 is in data communication with a plurality of image forming apparatuses 20 in a local system or in a distributed system of devices. This system of devices has to be controlled and maintained. The image forming apparatuses 20 can be printers, copiers, facsimile devices, multifunction peripherals (MFPs) or a mixture of these devices, for example. Optionally, the image forming apparatuses 20 may be accessed through other entities such as, for example, personal computers or servers. Optionally, the image forming apparatuses 20 may be accessed directly.

The data is data relating to the image forming apparatuses 20. In the network, a large amount of data specific to each image forming apparatus 20 is stored. Optionally, different types of image forming apparatus, e.g. image forming apparatuses made by different manufacturers, are provided in the network. Optionally, the image forming apparatuses 20 in the network provide data in different formats, which are collected by the data collector 10.

The image forming apparatuses 20 included in the network may vary with respect to their type, manufacturer, capabilities, etc. Optionally, the data collector database is flexible so as to support data in different formats from different types of image forming apparatuses 20.

Optionally, the data collector outputs data for a report via a reporting application. The reporting application may send a request to the data collector 10 for acquiring the data for the report. In response to the request, the data collector 10 outputs the data for the report from the data collector database in the data storage 13.

Optionally, the data collector 10 includes a cache memory 121. This is depicted in FIG. 1 and also in FIG. 2, which schematically depicts the data processor 12 of the data collector 10. The cache memory 121 may be part of the data processor 12 of the data collector 10. Alternatively, the cache memory 121 may be separate from the data processor 12, with the data processor 12 in communication with the cache memory 121. The data processor 12 is configured to write and modify data stored in the cache memory 121.

Figure 5:
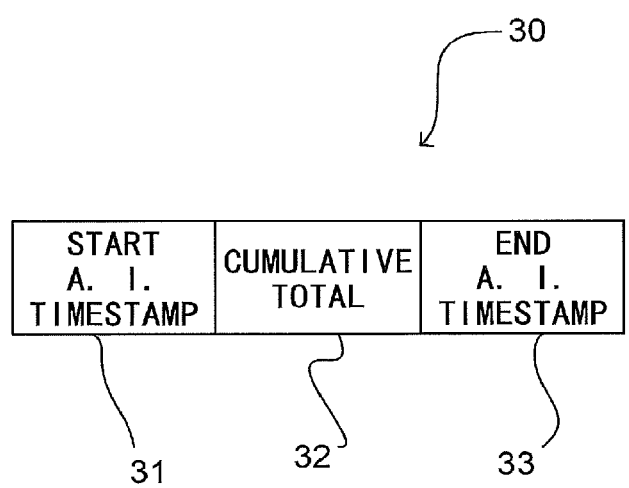
FIG. 5 schematically depicts a record stored in a cumulative data structure according to an embodiment.

The data collector 10 is configured to store and update a cumulative data structure. The cumulative data structure stores at least one record 30. FIG. 5 schematically depicts an example of a record 30 of the cumulative data structure for use in an embodiment. Optionally, the cumulative data structure is stored in the data collector database in the data storage 13. The cumulative data structure may form the data collector database. The data processor 12 updates individual records 30 of the data collector database.

Alternatively, the cumulative data structure may be stored in the cache memory 121. The data processor 12 updates individual records 30 stored in the cache memory 121. Completed records 30 from the cumulative data structure may subsequently be stored in the data collector database in the data storage 13.

Each record 30 is for recording a cumulative total 32 for a parameter counter for an image forming process. For example, the parameter counter may be a front page counter (e.g. the number of times that the front of a page has been printed). Alternative parameter counters may correspond to the number of scans performed, the number of faxes, the number of times that the back of a page has been printed or the number of duplex pages printed (i.e. the number of times that both the front and the back of a page have been printed).

The cumulative total 32 corresponds to the total count for that parameter counter within a predetermined accrual period. Optionally, the cumulative total 32 is an approximation of the total for the predetermined accrual period. The cumulative total 32 may not correspond to the exact count for the predetermined accrual period. This is because the beginning and end of the time periods may not necessarily correspond to the beginning and end of the predetermined accrual period.

Optionally, the predetermined accrual period corresponds to a reporting time interval. For example, when it comes to preparing a report, it may be desirable to know the total count (or an estimation of the total count) for a parameter counter over a period of one month, or one quarter (i.e. three months). Hence the predetermined accrual period may correspond to a period of one month or a period of a quarter, for example. The predetermined accrual period is not particularly limited and may alternatively be one day, one week or one year, for example.

In the record 30, the cumulative total 32 is recorded for the predetermined accrual period. The cumulative total 32 is associated with the predetermined accrual period in the record 30. As depicted in FIG. 5, the record 30 may record a start accrual interval timestamp 31 and an end accrual interval timestamp 33 for the predetermined accrual period. Hence, the predetermined accrual period has a particular length (e.g. one month or one quarter, or even one week), and also corresponds to a particular period in time. The record 30 records the cumulative total 32 for the predetermined accrual period that is defined by the start accrual interval timestamp 31 and the end accrual interval timestamp 33. The start accrual interval timestamp 31 indicates the start of the predetermined accrual period. The end accrual interval timestamp 33 indicates the end of the predetermined accrual period. Each of the start accrual interval timestamp 31 and the end accrual interval timestamp 33 may be a sequence of characters or coded information identifying when the start and end, respectively, of the predetermined accrual period occurred. For example, the start accrual interval timestamp 31 and the end accrual interval timestamp 33 may give the date and time of day.

Optionally, the method for processing data includes providing data of a parameter counter for a time period. The time period is different from the predetermined accrual period. Data may be collected by the data collector 10 at regular intervals. For example, the data collector 10, or a data collector application, may poll (e.g. send a request to) a plurality of image forming apparatuses 20 to request data of parameter counters for the relevant image forming apparatus 20. Accordingly, data coming from the image forming apparatuses 20 is collected regularly in time.

Optionally, the parameter counter is of a cumulative type. This means that the counter value provided by the image forming apparatus 20 indicates the value of the specific parameter at a specific moment in time. For a cumulative type, at a later moment in time, the counter value may have increased or may have stayed the same (but does not decrease). For example, a parameter counter of the cumulative type may be total printed pages. Other examples of parameter counters of the cumulative type include a copy counter, a scan counter, a fax counter, etc.

Optionally, the time period (for which data of the parameter counter is provided to the data collector 10) is the time period between two moments in time for which the counter value of the parameter counter is known. For example, the time period may be the time period between two moments in time at which the image forming apparatus 20 was polled.

Figure 4:
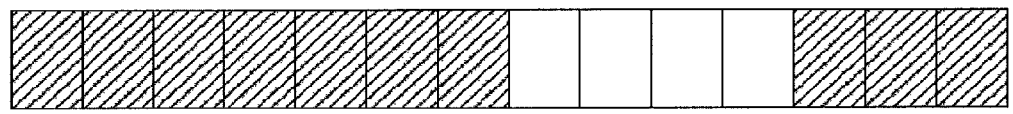
FIG. 4 schematically depicts a diagram illustrating data sparsity for data of a single image forming apparatus.
Figure 4:
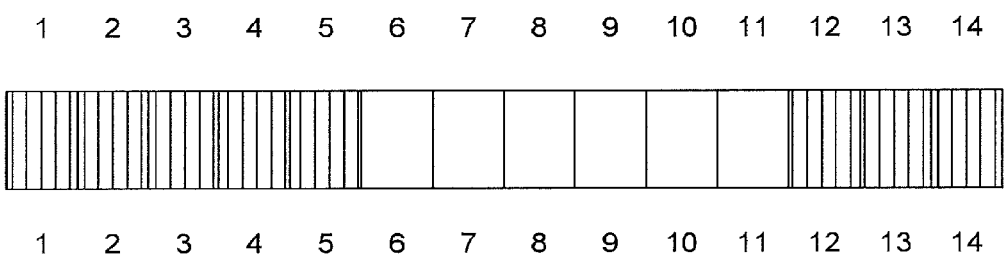
Figure 4:
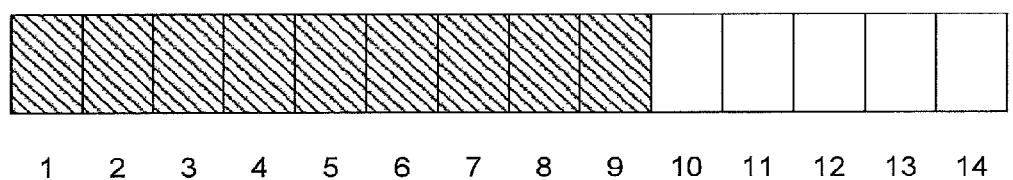
Figure 4:
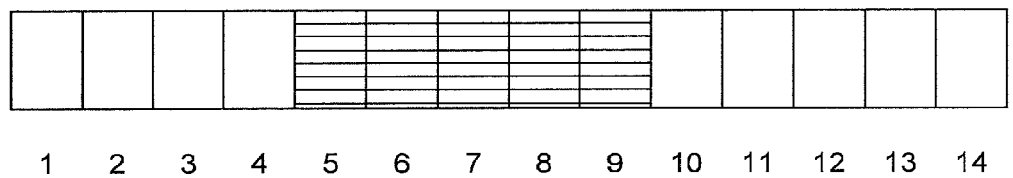

FIG. 4 depicts a schematic diagram illustrating data sparsity for an image forming apparatus 20. In FIG. 4, each bar represents a different parameter counter. Within each bar, each section represents a counter value at a different timing 1 to 14.

The top bar corresponds to a front page counter. The second bar corresponds to a back page counter. The third bar corresponds to a scan counter. The fourth (i.e. bottom) bar corresponds to a fax counter.

Where a section of the bar is shaded, this means that counter value data exists for that timing. Where a section of the bar is blank, this means that counter value data does not exist for that timing. This can happen where the image forming apparatus 20 is polled for counter value data, but the image forming apparatus 20 does not reply. For example, the image forming apparatus 20 may be switched off, or otherwise unavailable, or there may be an error.

For example, the top bar of FIG. 4 shows that counter value data for the front page counter existed for timings 1 to 7 and 12 to 14 but did not exist for timings 8 to 11. Optionally, data of a parameter counter for a plurality of time periods is provided. For example, considering the top bar of FIG. 4, data of the front page counter for the time period between timing 1 and timing 2 may be provided. This corresponds to the number of front pages printed after timing 1 and before timing 2. Similarly, data of the front page counter for a time period between timings 2 and 3 may be provided. This corresponds to the number of front pages printed after timing 2 and before timing 3. Data for other time periods can be similarly provided. There is no counter value data available for timings 8 to 11. Accordingly, data of the front page counter for the time period between timings 7 and 12 can be provided. This corresponds to the number of front pages printed after timing 7 and before timing 12. Data for the other types of parameter counters can be provided in the same way.

Optionally, the data collector 10 includes a data acquisitor 11. The data acquisitor 11 is configured to receive counter values at different timings from the image forming apparatus 20. The data acquisitor 11 is configured to produce the data of the parameter counter for the time period by calculating the difference between two parameter counter values polled at different times. For example, the data acquisitor 11 may subtract the counter value at timing 1 from the counter value at timing 2 in order to produce the data of the parameter counter for the time period between timing 1 and timing 2.

However, it is not necessary for the data acquisitor 11 to produce the data of the parameter counter for the time period. Alternatively, the image forming apparatus 20 may output the data of the parameter counter for the time period, such that it is not necessary for the data acquisitor 11 to produce this data of the parameter counter for the time period.

The time periods are set by the timings at which the image forming apparatus 20 is polled, or by the time periods used by the particular image forming apparatuses 20 for counting the parameter. The time periods do not necessarily correspond to the predetermined accrual periods of interest for reporting purposes. Furthermore, the time periods can be inconsistent due to the image forming apparatus 20 being unavailable or offline. For example, in the top bar of FIG. 4, the time period between timing 1 and timing 2 is shorter than the time period between timing 7 and timing 12. Additionally, the time period for one image forming apparatus may be different from the time period for a different image forming apparatus.

As depicted in FIG. 5, the record 30 records a cumulative total for a predetermined accrual period defined by the start accrual interval timestamp 31 and the end accrual interval timestamp 33. Optionally, the method for processing data includes determining whether or not the time period corresponds to the predetermined accrual period for which an existing cumulative total 32 is recorded in the record 30. It is determined whether the data of the parameter counter for the time period should be added to the existing cumulative total 32 or whether it belongs to a different accrual period.

Optionally, the data of the parameter counter for the time period (i.e. the counter value for that time period) is provided in association with a polling timestamp. A polling timestamp indicates a time which the image forming apparatus 20 was polled. For example, for the time period between timing 1 and timing 2, the polling timestamp may correspond to timing 2 indicating the end of the time period. Alternatively, the polling timestamp may correspond to timing 1, indicating the start of the time period. In an alternative embodiment, the data of the parameter counter for the time period includes polling timestamps indicating both the start and end of the time period.

Optionally, the determination of whether or not the time period corresponds to the predetermined accrual period of the record 30 in the cumulative data structure includes comparing the polling timestamp to the start accrual interval timestamp 31 and/or the end accrual interval timestamp 33 in the record 30. For example, if the polling timestamp is after the start accrual interval timestamp 31 and before the end accrual interval timestamp 33, then it is determined that the time period corresponds to the predetermined accrual period for which the existing cumulative total 32 is recorded in the record 30. The polling timestamp used for this comparison may correspond to the polling timestamp that indicates the end of the time period, or alternatively may be the polling timestamp that indicates the start of the time period. As a further alternative, a midpoint between the start and end of the time period may be used as the comparator for comparing to the start accrual interval timestamp 31 and the end accrual interval timestamp 33 in the record 30.

The record 30 is then updated based on the data of the parameter counter. In particular, if it is determined that the time period corresponds to the predetermined accrual period, then the updating includes updating the existing cumulative total 32. For example, if the cumulative total number of front pages printed so far in the accrual period of January is recorded in the record 30 as 150 and the data of the parameter counter shows that a further 50 front pages have been printed in January, then the existing cumulative total 32 is updated to (150+50=) 200, for a monthly accrual period of January.

Optionally the cumulative data structure stores a record 30 for each of a plurality of parameter counters. A parameter counter may be specific to a particular type of image forming process (e.g. printing front page, printing back page, scanning a page, faxing a page, etc.). Additionally or alternatively a parameter counter may be specific to a specific user of image forming apparatuses 20. Accordingly, it can be recorded how many of a particular type of image forming process is performed by a particular user on a particular image forming apparatus 20. However, it is not necessary for the parameter counter to be specific to a specific user.

Additionally or alternatively a parameter counter can be specific to a specific image forming apparatus 20. Accordingly it can be recorded how many of a particular type of image forming process is performed by anyone on a particular image forming apparatus 20. It is not necessary for the parameter counter to be specific to a particular image forming apparatus 20. For example, it can be recorded how many of a particular image forming process is performed on any image forming apparatuses by a particular user. Alternatively, it can be recorded how many of a particular image forming process is performed by any user on any image forming apparatus.

If it is determined that the time period does not correspond to the predetermined accrual period for which the existing cumulative total 32 is recorded in the record 30, then the updating includes starting a new cumulative total for a new predetermined accrual period to which the time period corresponds. A new record 30 may be created to record the new cumulative total for the new predetermined accrual period. For example, if the record 30 is for the accrual period of January and the data of the parameter counter is for a time period in February, then a new cumulative total for a new predetermined accrual period of February is started in a new record 30. The new record 30 is stored in the cumulative data structure.

Accordingly, the method for processing data consolidates the data. This permits automatic binding of already recorded data into specific, additional records of a coarser granularity, based on the required aggregation time granule (accrual period). For example, the initial data for an image forming apparatus could include hours and minutes based on polling counter data. The data collector 10 may require only monthly based granularity for monthly accruals. Therefore, the present disclosure provides a mechanism which allows hours and minutes based polling counting data to be linked to finitely defined monthly accounting intervals. This makes it possible to report counter values for image forming apparatuses over the accounting periods of months. The reporting speed depends on the amount of data required to be extracted, evaluated and processed. Accordingly, the present disclosure reduces the amount of data stored in the data collecting database, thereby speeding up reporting. The present disclosure provides an efficient method for parameter counters to be stored and reported on.

Previously it had been suggested to use a data warehouse in which large amounts of data with fine granularity from data collectors can be consolidated. In contrast, according to the present disclosure data is processed inline, such that only processed data (i.e. consolidated data) is stored in the data collector database in the data storage 13 of the data collector 10. The present disclosure can reduce the burden on reporting by storing only data that is useful for reporting.

Figure 3:
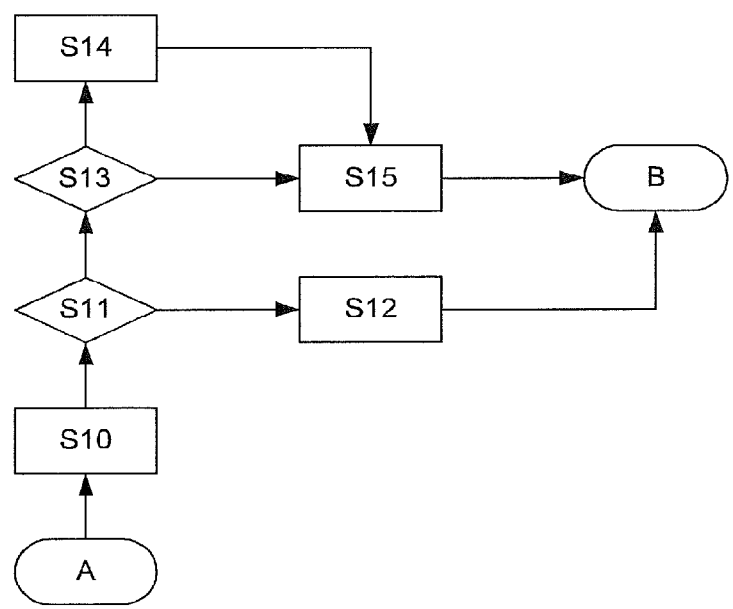
FIG. 3 is a flow chart depicting a method for processing data according to an embodiment.

FIG. 3 schematically depicts a flow chart illustrating a method for processing data according to an embodiment of the invention. In FIG. 3, the method starts at A. In Step S10, the accrual period boundaries are calculated. For example, the start and end boundaries of an accrual period of one week are calculated.

Of course, the cumulative data structure, which may be stored in the data collector database in the data storage 13 or in the cache memory 121, may store a plurality of records 30 corresponding to different parameter counters. There may be a plurality of records 30 for different parameter counters over the same predetermined accrual period.

Optionally, the method includes identifying that the parameter counter of which the data is provided for the time period corresponds to the parameter counter for which the cumulative total 32 is recorded in the record 30. The parameter counter may be identified by a unique identifier of an image forming apparatus 20, a personal identifier of a user and/or an identifier of the image forming process. The identified parameter counter can be compared to the parameter counters for which records 30 are stored in the cumulative data structure. When a match is found, the time period can be compared to the predetermined accrual period for that record 30 so as to determine if the data for that time period belongs to the predetermined accrual period or to a different (e.g. later) accrual period.

In Step S11 it is determined whether or not the time period corresponds to the predetermined accrual period for which the existing cumulative total is recorded in a record 30 stored in the cumulative data structure. For example, the time period (for which data of the parameter counter is provided) is compared to the boundaries of the predetermined accrual period for which the existing cumulative total 32 is recorded in a record 30 stored in the cumulative data structure. If it is determined that the time period does not correspond to the predetermined accrual period for which the existing cumulative total 32 is recorded, then it may be determined that the time period corresponds to a new predetermined accrual period.

If this happens then the process continues to Step S13 in which it is determined whether an accrual begin interval exists in a record 30 stored in the cumulative data structure. This may be done by determining whether a start accrual interval timestamp 31 exists for a record 30 for the parameter counter. If the start accrual interval timestamp 31 exists, then this means that the current (i.e. open) record 30 for that parameter counter corresponds to the old predetermined accrual period (i.e. an accrual period that has finished). Accordingly, in Step S14, that record 30 is closed. This means that the information in the record 30 is stored (e.g. for longer term storage) in the data storage 13, for example in a data collector database. When it is determined that the time period does not correspond to the predetermined accrual period for which the existing cumulative total 32 is recorded in a record 30 stored in the cumulative data structure, the information of the predetermined accrual period and the existing cumulative total 32 is stored in the data collector database.

Subsequently, in Step S15, s new record 30 is created. In other words, a new record 30 is created and a start accrual interval timestamp 31 may be inserted in the new record 30. The data of the parameter counter for the time period is used to start the new cumulative total 32 for the new record 30.

Alternatively, in Step S13 if it is determined that no accrual begin interval exists in the current record, then this means that there is no information to be stored for longer term storage in the data collector database and the method can proceed straight to Step S15 where a new record 30 is started. The method then ends at B.

Alternatively, if in Step S11 it is determined that the time period corresponds to a predetermined accrual period for which an existing cumulative total is recorded for that parameter counter, then processing proceeds to Step S12. In Step S12 the existing cumulative total 32 is updated based on the counter value for the parameter counter for the time period. The method then ends at Step B.

Hence, the method of the present disclosure includes two stages of data processing. In the first stage the recorded fine granular data is registered inside the caching subsystem of the data collector 10. The data is registered based on the time interval of interest of data processing. In the second stage of the process, counter data is finally stored inside the data collector database in the data storage 13 of the data collector 10.

Accordingly, data for a cumulative parameter can be processed and consolidated inline. This means that instead of storing a large amount of data that is subsequently consolidated, the data is consolidated as it is stored. This reduces the amount of storage space required to store the information that is useful for reporting. This is possible even for cumulative parameters where the cumulative total is provided in response to polling.

Accordingly, the information that is useful for reporting can be stored in the data collector database from which it can be accessed for reports. The data collector database has high density (low sparsity) data in that a high proportion of the data stored in the data collector database is useful for reporting.

As mentioned above, each record 30 may be stored temporarily in the cache memory 121 while it is being updated (i.e. until the accrual period is finished). In this case, after the record 30 is stored in the data collector database, that record 30 may be deleted from the cumulative data structure. Accordingly, after each record 30 is written into the data collector database, the record 30 is wiped from the cache memory 121 (or other memory in which the cumulative data structure is stored). This reduces the size of the cache memory 121 required.

Optionally, the record 30 is copied from the cache memory 121 to the data collector database without undergoing substantially any data format transformation before being stored in the data collector database. Accordingly, an embodiment of the present disclosure provides a simple and efficient way of storing useful data. No data format transformation is required, thereby reducing the required processing power to store the information in a manner that can be accessed efficiently for reporting.

Optionally, the updating of the cumulative data structure includes creating a new record 30 for a new predetermined accrual period or a new parameter counter, for example. Alternatively, if the data of the parameter counter for the time period corresponds to an existing record 30, then that existing record 30 may be updated.

After the updating has been completed, the data of the parameter counter is no longer needed, such that it does not need to be stored. This reduces the size of the cache memory 121 required for the method for processing data.

Accordingly, data for a plurality of parameter counters can be stored, and consolidated as it is stored, simultaneously, using the same memory. This provides an efficient way to record the information that is required for reporting.

Optionally, the data collector database and/or the cumulative data structure stores the at least one record 30 according to a relational database management system. Accordingly, a standard relational database management system can be used to store the data in the data collector database. The relational database management system is for data storage. The relational database management system is cheap, easily manageable, efficient in data storage and widespread on the market. Hence, data can be stored efficiently in the data collector database.

Figure 2:
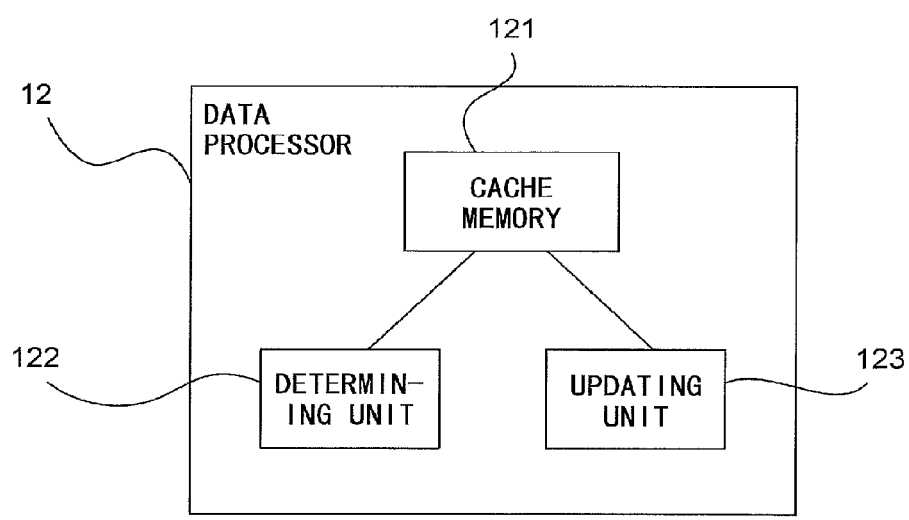
FIG. 2 schematically depicts part of a data collector according to an embodiment.

FIG. 2 schematically depicts the data processor 12 of a data collector 10 according to an embodiment of the invention. The data processor 12 includes the cache memory 121. Optionally, the data processor 12 includes a determining unit 122. The determining unit is configured to determine whether or not the time period corresponds to a predetermined accrual period for which an existing cumulative total is recorded in the cumulative data structure. The determining unit 122 is connected to the cache memory 121. This allows the determining unit 122 to access the information stored in the cache memory 121.

As shown in FIG. 2, optionally the data processor 12 includes an updating unit 123. Optionally, the updating unit 123 is configured to calculate the data of the parameter counter. The updating unit 123 is configured to update the cumulative data structure based on the data of the parameter counter. The updating unit 123 is connected to the cache memory 121. This allows the updating unit 123 to write data into the cumulative data structure stored in cache memory 121.

For example, the data acquisitor 11 may poll an image forming apparatus 20 and calculate a counter value for a time period. The data acquisitor 11 then sends the counter value (i.e. data of the parameter counter for the time period) to the data processor 12. Optionally, the data processor 12 calculates the data of the parameter counter for the time period. The data processor 12 updates a record 30 based on the data of the parameter counter.

The updating unit 123 is configured to update the records 30 in the cumulative data structure. The updating unit 123 is connected to the data storage 13. This allows the updating unit 123 to write data into the cumulative data structure if it is stored in data storage 13. The updating unit 123 can store records 30 in the data collector database in the data storage 13.

As mentioned above, the cumulative total 32 stored in the record 30 may be only an approximation of the true counter value (e.g. the true number of front pages printed) within the predetermined accrual period. This is because the beginning and end of the time periods may not necessarily correspond to the beginning and end of the predetermined accrual period. Taking the example of FIG. 4, if the boundary between two predetermined accrual periods were to fall between timing 7 and timing 12, then it could not be known how many of the front pages are printed between timing 7 and timing 12 were printed in one predetermined accrual period as opposed to the other. The present disclosure provides a robust way of storing the data by providing this approximation.

Although the invention is described primarily in the context of parameter counters for an image forming process, the concepts of the present disclosure can be applied to other contexts. Examples of the image forming process include a printing process, a copying process and a faxing process. The image forming process can be formed on an image forming apparatus. Examples of the image forming apparatus include a printer, a copier and a facsimile device.

In view of the upcoming "electronic household", other devices such as refrigerators, washing machines, TV's and mobile phones can be accessed through other devices such as a personal computer or a server, for example. These devices can also be accessed directly. These devices can provide or contain data which may be in a machine readable digital format or in a format that can be digitised. The data can be optical, mechanical or of another type that can be measured, evaluated and converted into a machine-readable electronic format. The concepts of the present disclosure can be applied to processing and storing data from these devices.

What is claimed is:

1. A method for a data collecting device, the method comprising:
   storing, in a memory or a storage of the data collecting device, a cumulative data structure for storing at least one record for recording for a respective predetermined accrual period a respective cumulative total for a respective parameter counter for an image forming process performed by a corresponding image forming apparatus;
   acquiring, by a data processor of the data collecting device, data of a parameter counter in association with a time period;
   determining, by the data processor of the data collecting device, whether or not the time period corresponds to a predetermined accrual period for one of the at least one record recorded in the cumulative data structure; and updating, by the data processor of the data collecting device, the cumulative data structure based on the data of the parameter counter, including:
when it is determined that the time period corresponds to the predetermined accrual period for the one of the at least one record stored in the cumulative data structure, updating the cumulative total recorded in the one of the at least one record; and
when it is determined that the time period does not correspond to the predetermined accrual period for the at least one record stored in the cumulative data structure, starting a new record in the cumulative data structure for recording a new cumulative total for a new predetermined accrual period to which the time period corresponds.

2. The method of claim 1, further comprising producing the data of the parameter counter for the time period by calculating the difference between two parameter counter values at different times.

3. The method of claim 1, wherein the cumulative data structure is stored in a data collector database stored in the storage of the data collecting device, and the storage is a data storage of the data collecting device from which data of the parameter counter is outputted for a report.

4. The method of claim 1, wherein the cumulative data structure is stored in the memory of the data collecting device, and the memory is a cache memory of the data collecting device that is separate from a data storage of the data collecting device from which data of the parameter counter is outputted for a report.

5. The method of claim 4, further comprising, when it is determined that the time period does not correspond to any predetermined accrual period for the at least one record stored in the cumulative data structure, updating a data collector database stored in the data storage based on an existing record stored in the cumulative data structure in the cache memory for the parameter counter associated with the acquired data.

6. The method of claim 5, further comprising, after the updating the data collector database based on the existing record, deleting the existing record from the cumulative data structure in the cache memory.

7. The method of claim 1, wherein each record of the at least one record stores one or more of:
a unique identifier for an image forming apparatus that performed the respective image forming process that the respective parameter counter is for;
a start accrual interval timestamp indicating a start of the respective predetermined accrual period;
an end accrual interval timestamp indicating an end of the respective predetermined accrual period;
a personal identifier indicating a user that instructed performing the image forming process that the parameter counter is for; and
a parameter identifier indicating the image forming process.

8. The method of claim 1, further comprising, after the updating the cumulative data structure, the acquired data of the parameter counter is deleted from the memory or the storage of the data collecting device in which the acquired data of the parameter counter is stored.

9. The method of claim 1, further comprising identifying the one of the at least one record recorded in the cumulative data structure that is for the parameter counter associated with the acquired data.

10. The method of claim 1, wherein the cumulative data structure stores a respective record for each of a plurality of parameter counters.

11. The method of claim 1, wherein the new predetermined accrual period is chronologically subsequent to a predetermined accrual period for an existing record stored in the cumulative data structure for the parameter counter associated with the acquired data.

12. The method of claim 1, wherein the parameter counter associated with the acquired data is of a cumulative type.

13. A data collecting device, comprising:
a memory or a storage configured to store a cumulative data structure for storing at least one record for recording for a respective predetermined accrual period a cumulative total for a parameter counter for an image forming process performed by a corresponding image forming apparatus; and
a data processor configured to:
acquire data of a parameter counter in association with a time period;
determine whether or not the time period corresponds to a predetermined accrual period for one of the at least one record recorded in the cumulative data structure; and
update the cumulative data structure based on the data of the parameter counter, including:
when it is determined that the time period corresponds to the predetermined accrual period for the one of the at least one record stored in the cumulative data structure, updating the cumulative total recorded in the one of the at least one record; and
when it is determined that the time period does not correspond to the predetermined accrual period for the at least one record stored in the cumulative data structure, starting a new record in the cumulative data structure for recording a new cumulative total for a new predetermined accrual period to which the time period corresponds.

* * * * *